Jan. 23, 1923. 1,443,321

H. LEITNER.
ELECTRIC ACCUMULATOR OR STORAGE BATTERY.
FILED JUNE 23, 1922.

Inventor:
Henry Leitner
By
George A. Prevost
Atty.

Patented Jan. 23, 1923.

1,443,321

UNITED STATES PATENT OFFICE.

HENRY LEITNER, OF LONDON, ENGLAND.

ELECTRIC ACCUMULATOR OR STORAGE BATTERY.

Application filed June 23, 1922. Serial No. 570,419.

*To all whom it may concern:*

Be it known that I, HENRY LEITNER, a subject of the King of Great Britain, residing at Regent House, Kingsway, London, England, have invented new and useful Improvements in Electric Accumulators or Storage Batteries, of which the following is a specification.

This invention relates to electric accumulators or storage batteries of the kind in which each element comprises one or more pencils of active material on a lead support or conductor of square, round or other cross section, the said pencils being separated from one another by porous and/or perforated material, which is built up to form a cellular structure for the reception of the pencils and which are inserted endwise therein and fit within an enclosing casing.

According to the invention I form the grids with ridges or ribs at right angles thereto to provide grooves for the reception of the pencil electrodes.

In a suitable arrangement for carrying out the invention, one form of grid is made with the ridges or ribs either on one side only or on both sides. The back of the next grid may then close up the open face of the grooves or a piece of treated veneer may be placed against the ridges for this purpose or the face may be left wholly or partly open. Again, two grooved grids may be placed with their ridges meeting or with a space between them and the pencils placed within the receptacles so formed.

The pencils themselves are preferably arranged as to polarity with respect to each other so that they are surrounded on every side by pencils of opposite polarity. For example, when a subdivided plate is built up, a negative pencil is followed by a positive pencil and that again by a negative pencil, and with two facing plates the order may be reversed so that a positive pencil of say square cross section has each one of its four surfaces faced by a negative pencil.

To enable the invention to be fully understood, I will describe it by reference to the accompanying drawings, in which:—

Figure 1:
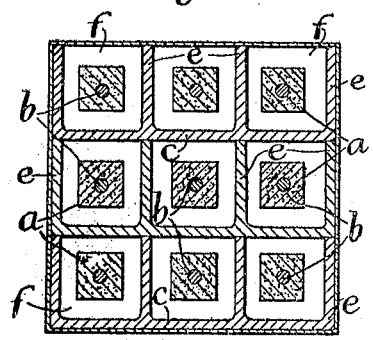
Figure 1 is a horizontal section of an electric accumulator constructed in accordance with my invention and Figure 2 is an elevation of one of the pencils of active material used in conjunction therewith.
Figure 2:
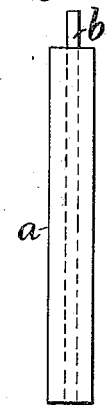

Referring to Figures 1 and 2, $a$ indicates the pencils constituting the battery, the said pencils being formed of active material on a lead core or support $b$ which forms a conductor, each pencil being of square form in cross section. $c$ indicates the grids and $d$ the container for the battery, the said grids being of treated porous wood or other suitable material such as celluloid or ebonite perforated to allow the passage of the electrolyte, each grid being provided with ridges or ribs $e$ at right angles thereto, on one side only, so as to form spaces or grooves $f$ to receive the pencils, the said ribs of each grid butting against the back of the grid in front of it except the front one of the series which butts against the container $d$. By so fitting the grids together the pencils are completely enclosed. As the pencils are shown of smaller dimensions than the enclosing grooves the spaces between them and the walls of the grooves may be filled with glass-wool or other absorbent.

Figure 3:
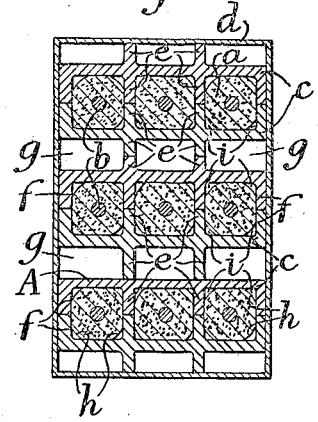
Figures 3, 4 and 5 are similar views to Figure 1 illustrating modifications.

In Figure 3 some of the grids $c$ are shown formed with the ribs $e$ on both sides so as to constitute the grooves $f$ and also spaces $g$, and in one instance, as indicated at A, the spaces $g$ are shown formed by the ribs $e$ on one side only of the grid. In this arrangement the pencils of active material have flat sides to fit within the grooves or spaces $f$ and with rounded corners $h$ so as to leave spaces $i$ for the electrolyte, spaces also may be left between the opposed edges of the ribs $e$ enclosing the pencils.

Figure 4:
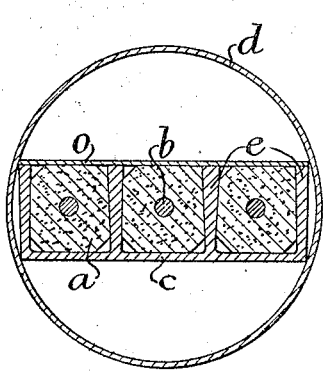

Figure 4 shows a circular form of battery wherein three pencils $a$ are employed, and held in position in the grooves of a grid similar to that shown at A, Figure 3, the grooves being closed by a veneer $o$ of treated wood and the ribs $e$ being slightly undercut or tapered to hold the pencils securely, the said pencils being of a form in cross-section similar to that shown in Figure 3.

Figure 5:
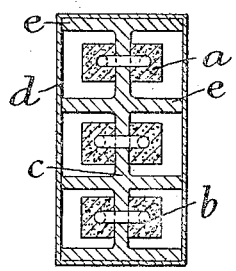
Figure 6:
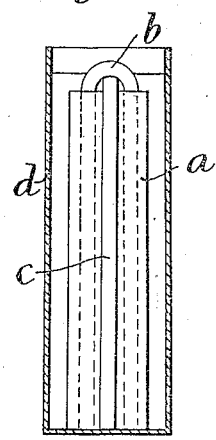
Figure 6 is a sectional elevation of the construction shown in Figure 5.

Figures 5 and 6 illustrate another form of the invention in which a grid similar to one of those shown in Figure 3 is employed, viz. a grid $c$ having a series of ribs $e$ on both sides, the said ribs fitting between the sides of the container $d$ so as to form a series of grooves on both sides of the grid, in which grooves the pencils $a$ are placed in contact with the grid, each opposed pair of pencils having a common lead core or conductor $b$ which passes over the top of the grid from one pencil to the other.

Although the lead cores $b$ are indicated throughout the drawings as being covered by the active material it is to be understood that projections may be formed on the said cores which may project through the said material to act as distance pieces to keep the said material out of close contact with the grids.

I am aware that storage battery plates or elements have been constructed comprising a grooved support of porous material, the grooves of which are filled with active material in which metallic conductors are embedded, the whole forming an integral member or unit.

Claims.

1. An electric accumulator comprising a container and grids, at least one side of said grids being provided with ribs extending at right angles thereto, forming grooves for the reception of pencil electrodes, said electrodes being completely enclosed, said pencils being arranged in pairs in the grooves on either side of a grid and having a common lead core.

2. An electric accumulator comprising a container and a grid, said grid having a series of ribs on both sides, said ribs fitting between the sides of the container so as to form a series of grooves on both sides of the grid, in which grooves pencils are placed in contact with the grid, each opposed pair of pencils having a common lead core which passes over the top of the grid from one pencil to the other.

HENRY LEITNER.